Patented Sept. 28, 1937

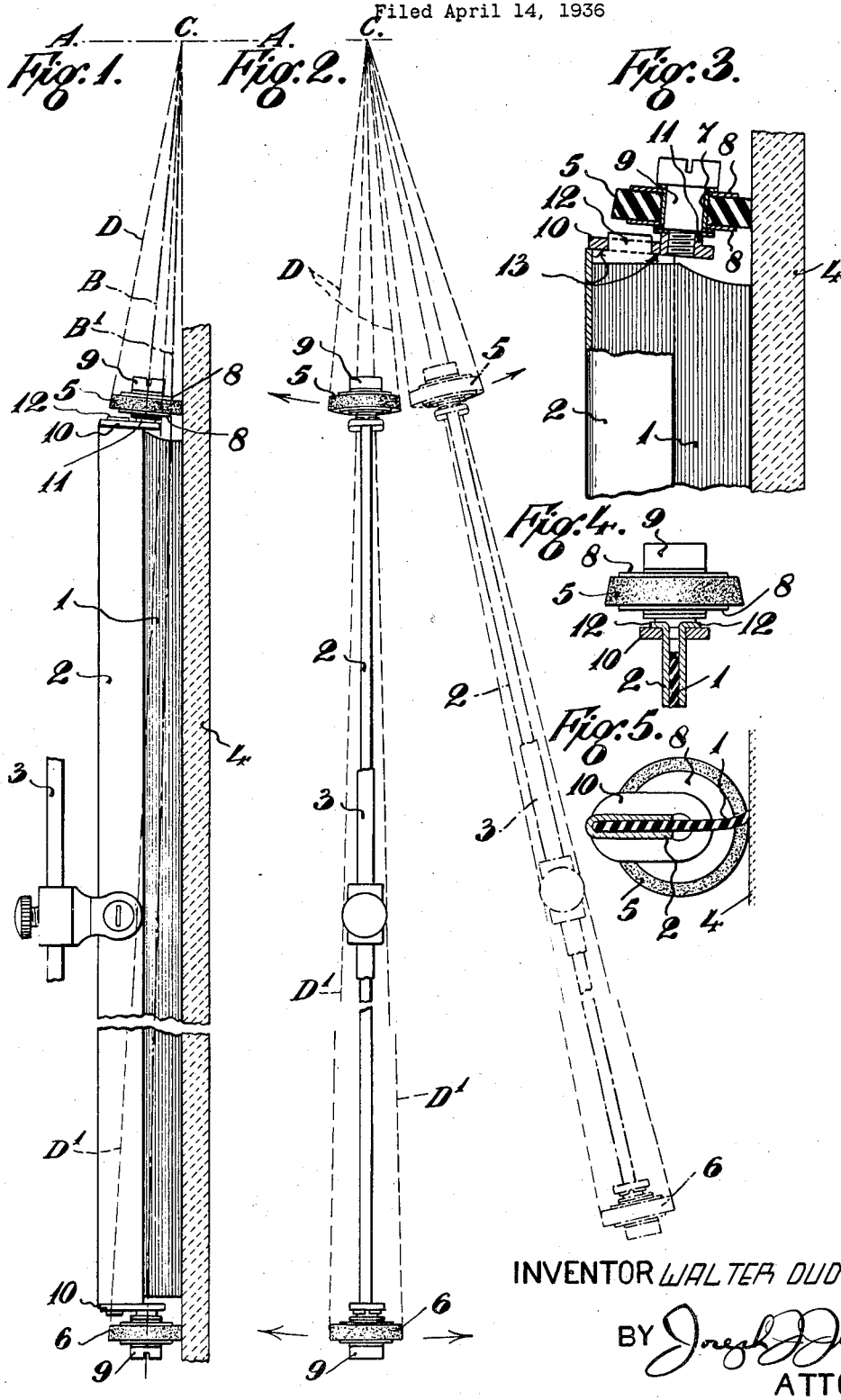

2,094,206

UNITED STATES PATENT OFFICE 2,094,206

WIND SCREEN WIPER

Walter Dudley, Redditch, England

Application April 14, 1936, Serial No. 74,243
In Great Britain March 14, 1936

4 Claims. (Cl. 15—255)

This invention relates to motor-vehicle and other windscreen wipers of the kind comprising an angularly-movable spring-pressed wiper blade, consisting of a flexible strip carried by a holder or frame, which is oscillated backwards and forwards, through an arc of a circle, with the flexible strip in contact with the surface of the screen.

The object of the present invention is to provide an improved angularly-movable windscreen wiper blade having means for limiting the pressure of the flexible strip upon the screen and thereby preventing flattening or undue deflection of the strip, and also for reducing friction or wear and for ensuring the easy and reliable operation of the wiper with a minimum expenditure of power.

According to the invention the holder or frame of a windscreen wiper blade carries rollers at opposite ends which are arranged to roll in concentric arcuate paths over the surface of the screen during the oscillation of the wiper blade. Thus, the said rollers may be of essentially conical form, mounted upon an axis or axes which pass through the axis of oscillation of the wiper.

Figure 1 of the accompanying drawing is a side elevation of a wiper blade in accordance with one form of the invention.

Figure 2 is a front elevation of the said wiper blade showing, in dotted lines, another position which the blade takes during the oscillation over the screen surface.

Figure 3 is a section, on a larger scale, through the roller and its mounting at one end of the blade.

Figure 4 is a longitudinal section through one end of the blade holder or frame, showing how the roller-carrying bracket plate is secured thereto.

Figure 5 is a cross-section through the wiper blade, showing one of the rollers in elevation.

Referring to the said drawing, the wiper blade comprises one or more rubber or other flexible wiper strips 1 carried by a holder or frame 2 connected to the usual spring-influenced operating arm 3 which is angularly oscillated about the axis A—A of the driving motor so that the wiper moves over the surface of the screen 4 through an arc of a circle.

The holder 2 is conveniently formed from a strip of sheet-metal which is folded or bent longitudinally to a U-section, as shown in Figure 5, the wiper strip 1 being gripped or held between its sides. Mounted upon opposite ends of the holder 2 are rubber or other rollers 5, 6, the peripheries of which engage and roll over the surface of the screen 4 and thus serve as revolving distance pieces which prevent undue deflection or flattening of the strip 1 under the influence of the spring-pressed arm 3, thereby ensuring an efficient wiping action and also reducing friction and wear. The rollers 5, 6, are of conical form with their peripheries lying flat upon the screen surface being in the same plane at the points of contact with said surface. The rollers are preferably of approximately the same diameter at their larger ends, and their axes about which they turn (shown by dotted lines B, B¹) meet or intersect at the axis of oscillation A—A, namely, at point C lying in the plane of the screen surface. The axis B of the upper roller 5 makes a larger angle with the screen than does the axis B¹ of the lower roller 6, and the periphery of the said upper roller 5 is more steeply coned than is the periphery of the roller 6, but all portions of the peripheries of both rollers lie in planes which intersect at the point C on the oscillation axis A—A as shown by dotted lines D, D¹.

When the blade is oscillated by the arm 3 the rollers 5, 6, will roll in true arcuate and concentric paths having the point C as their common centre, as indicated by the arrows E, E¹, in Figure 2, and thus a correct rolling action is obtained without slip or sliding friction.

The rollers 5, 6, are both mounted in the same manner, as illustrated in Figures 3 to 5 in relation to the upper roller 5. Thus the roller is provided with a central bearing sleeve or eyelet 7 the ends of which are closed on to or engaged with side plates 8, 8, at opposite sides of the roller. The sleeve 7 turns freely upon a pivot pin 9 projecting at right-angles from a bracket plate 10 fixed to the end of the holder 2. Thus, the inner end of the pivot pin 9 may be screwed into a threaded boss 11 raised from the plate 10, and the said plate 10 is firmly secured to the holder 2 by providing the sides of the latter with a pair of end lugs 12, 12, (Figure 4) which are passed through a hole in the plate 10 and are bent over in opposite directions, the plate being held firmly against an inclined end surface or shoulder 13 at the extremity of the holder. The angle of this surface 13 is made such that the axis of the pivot pin 9 lies at the desired angle, corresponding to the line B or B¹ respectively, so that the shoulder 13 and plate 10 at the upper end of the blade will be at slightly different angles to the longitudinal axis of the holder 2.

Having fully described my invention, what I desire to claim and secure by Letters Patent is:—

1. A windscreen wiper blade comprising a flexible wiper strip carried by a holder or frame provided at opposite ends with rollers mounted upon different axes inclined to the edge of the blade so as to intersect at the axis of oscillation.

2. A windscreen wiper blade comprising a flexible wiper strip carried by a holder or frame provided at opposite ends with conical rollers mounted upon different axes inclined to the edge of the blade so as to intersect on the axis of oscillation, the peripheries of the rollers lying in the same plane at the side of the blade which is to be opposed to the screen.

3. A windscreen wiper blade comprising a flexible wiper strip carried by a holder or frame provided at opposite ends with conical rollers mounted upon pivot pins carried by bracket plates at right-angles thereto, said plates being secured against inclined surfaces on the ends of the holder so that the axes of the pins are inclined to the edge of the blade and the peripheries of the rollers lie in the same plane at the side of the blade which is to be opposed to the screen, the axes of said pivot pins intersecting said plane at a common point.

4. A windscreen wiper blade adapted for angular oscillation over the surface of a windscreen, comprising a flexible wiper strip, a holder carrying and extending longitudinally for the entire length of the strip, pivot pins carried by opposite ends of the holder with their axes inclined at different angles to but in the same direction from the edge of the blade and intersecting at a common point situated beyond one end of the holder, and rollers mounted on said pivot pins with their peripheries lying in the same plane at the side of the blade which is to be opposed to the screen, which plane also contains the point of intersection of the pivot pin axes, so that the rollers will roll over the windscreen surface in concentric arcuate paths.

WALTER DUDLEY.